United States Patent
Bosworth

(10) Patent No.: US 7,328,791 B1
(45) Date of Patent: Feb. 12, 2008

(54) CONTAINER LID WITH DISC SHAPED MEDIA

(76) Inventor: John O. Bosworth, 601 N. Broadway, Upper Nyack, NY (US) 10960

( * ) Notice: Subject to any disclaimer, the term of this patent is extended or adjusted under 35 U.S.C. 154(b) by 521 days.

(21) Appl. No.: 10/878,560

(22) Filed: Jun. 29, 2004

Related U.S. Application Data

(60) Provisional application No. 60/483,872, filed on Jun. 30, 2003.

(51) Int. Cl.
*B65D 85/57* (2006.01)

(52) U.S. Cl. .................. 206/308.1; 206/217; 206/303; 206/493

(58) Field of Classification Search ............ 206/308.1, 206/217, 303, 307, 308.2, 485.1, 232, 493; 220/694, 212, 521, 713, 254.1, 217, 709, 220/522, 711, 255, 705, 254.2, 256.1, 253; 215/388, 229

See application file for complete search history.

(56) References Cited

U.S. PATENT DOCUMENTS

| | | | |
|---|---|---|---|
| 3,048,317 A * | 8/1962 | Cochrane et al. ........ 229/103.1 |
| 4,948,009 A * | 8/1990 | Sawatani .................... 220/229 |
| 5,511,659 A | 4/1996 | Bosworth |
| D384,278 S | 9/1997 | Bosworth |
| D384,538 S | 10/1997 | Bosworth |
| 5,782,452 A | 7/1998 | Bosworth |
| 5,799,784 A | 9/1998 | Bosworth |
| 5,806,672 A | 9/1998 | Bosworth |
| 5,829,583 A * | 11/1998 | VerWeyst et al. ........ 206/308.1 |
| 6,070,752 A * | 6/2000 | Nava et al. ................. 220/521 |
| 6,196,411 B1 | 3/2001 | Nava et al. |
| 6,299,014 B1 | 10/2001 | Nava et al. |
| 6,302,288 B1 | 10/2001 | Nava et al. |
| 6,364,102 B1 * | 4/2002 | Gordon et al. ............. 206/217 |
| 6,371,289 B1 * | 4/2002 | Gordon et al. ............. 206/232 |

* cited by examiner

*Primary Examiner*—Mickey Yu
*Assistant Examiner*—Steven A. Reynolds
(74) *Attorney, Agent, or Firm*—Blank Rome LLP

(57) ABSTRACT

A lid for a container that includes a first element adapted to releasably engage the container and has first and second raised seals extending from a surface of the first element. The first raised seal has a diameter that is larger than a diameter of the second raised seal. An opening is centrally disposed in the first element. A second element is engageable with the first element. The second element includes first and second raised seals extending from a surface of the second element and an opening is centrally disposed therein. The first and second raised seals are aligned with and receive the first and second seals of the first element, respectively. A chamber is defined between the surfaces of the first and second elements and between the first raised seals and the second raised seals of the first and second elements.

9 Claims, 5 Drawing Sheets

CONTAINER LID WITH DISC SHAPED MEDIA

RELATED APPLICATION

This application claims the benefit of co-pending provisional Application Ser. No. 60/483,872 to Bosworth Sr., filed Jun. 30, 2003, and entitled Container Lid With Disc Shaped Media and Method of Use, the subject matter of which is incorporated by reference in its entirety.

FIELD OF THE INVENTION

This invention relates to a device for packaging and displaying a circular or disc-shaped media and to container lids generally. More particularly, but not by way of limitation, the invention relates to a novel container lid having a media disc disposed therein. Still more particularly, the present invention relates to a new and improved container for initially packaging and thereafter repeated storing of disc-shaped media.

BACKGROUND OF THE INVENTION

Media discs disposed in beverage cup lids have become an increasingly popular method of, for example, advertising or offering premiums to buyers of the beverage. Such beverages may, for example, be coffee, soft drinks, or soup. The media disc can be a miniature CD or DVD disc. The patron purchases a drink in the cup and retrieves the media disc from the lid thereof. The media disc can then be played on portable equipment and/or taken to the patron's home, vehicle or work place for later playing.

Problems however arise with conventional lids that have compartments for retaining media, particularly when the lids are used for drink cups or other containers containing beverages. Typically, the lid is configured with a opening, such as a pair of crossed slits, for receiving a straw. When a straw is inserted through the slits, liquid can seep through the slits and into the lid compartment, thereby damaging the contents therein, perhaps rendering the contents unusable. Indeed, seepage through the slits is virtually inevitable if the portion of the lid in which the slits are formed is disposed near the level of the beverage. In such a case, downward displacement of the lid as a result of the initial insertion of the straw through the slits typically submerges the slits within the beverage causing substantial seepage through the slits.

In cases where the lid compartment is at or below the level of the cup lip, the volume of this compartment actually displaces the interior volume of the cup and thus upon attachment of the lid would cause substantial spillage in a fully filled beverage. Moreover, customers at quick service restaurants and the like usually prefer beverages to be filled to the brim. With the beverage filled to the brim, substantial seepage or spillage can occur upon insertion of the straw or attachment of the lid itself causing considerable annoyance to the customer and extra work for the restaurant staff mopping up the spilled beverages. To avoid this problem, beverage cups are often filled only to a specified level well below the brim of the cup. In restaurants where the cup is automatically filled, automatic filling devices therefore need to be properly set and monitored to ensure that the beverage does not exceed the specified level. If the cup is manually filled by the staff, the staff therefore needs to constantly remember to fill the cup only to the specified level. Furthermore, in many quick service restaurants, the customers fill their own beverage cups, thereby permitting re-fills by the customer. The customers are often not aware that filling the cup to the brim will cause subsequent spillage and, hence, the customers typically overfill the cups resulting in frequent and substantial spillage in the vicinity of the beverage dispensers.

In general, a substantial risk of seepage or spillage occurs if either the crossed slits of the closure or the compartment itself are positioned such that, when the closure is mounted to the drink container, the slits on the bottom of the compartment are positioned at or below the top perimeter edge of the drink container. Unfortunately, prior art compartment closures for drink containers are typically configured to position both the crossed slits and the bottom of the compartment well below the top perimeter edge of the drink container. These prior art beverage lids allow leakage into the compartment.

U.S. Pat. No. 6,070,752 to Nava et al. addressed the leakage problem by raising the straw entry openings by providing a raised portion within which the crossed slits are formed. The slits are thereby disposed, in use, well above the level of any liquid within the drink container such that, even with a straw inserted through the slits, it is highly unlikely during normal use of the cup that any liquid from within the cup will pass though the slits and into the compartment. Hence, contents within the compartment are substantially protected from contamination by the liquid even if the cup is initially filled to the brim and even if significant downward displacement of the closure occurs upon insertion of the straw. However, this results in a lid that rises high above the beverage.

Additionally, many conventional lids are bulky and cannot be loaded automatically. Also, sealing with RF or adhesives to prevent leakage is expensive and often unattractive.

SUMMARY OF THE INVENTION

Accordingly, an object of the present invention is to provide a merchandise container closure, particularly a closure for use with drink containers, with a compartment wherein the closure is configured to avoid the aforementioned problems without rising high above the beverage and it is to that end that the invention is primarily directed.

Another object of the present invention is to provide a lid that requires no adhesive, RF sealing, or like means of attachment and/or sealing.

Yet another object of the present invention is to provide a lid with a media disc disposed therein that can have the elements thereof mechanically attached.

Still another object of the present invention further provides such a lid that can be assembled with high-speed equipment.

Another object of the present invention further provides such a lid with a media disc disposed therein that seals the media disc from the contents of a beverage cup and is attractive.

Still yet another object of the present invention further provides such a lid with a media disc disposed therein that seals the media disc from the contents of a beverage cup and is not held high above the cup and beverage.

Another object of the present invention yet further provides such a lid that can be handled without it coming apart.

The foregoing objects are basically attained by a lid for a container that includes a first element adapted to releasably engage the container and has first and second raised seals extending from a surface of the first element. The first raised seal has a diameter that is larger than a diameter of the second raised seal. An opening is centrally disposed in the first element. A second element is engageable with the first element. The second element includes first and second raised seals extending from a surface of the second element and an opening is centrally disposed therein. The first and second raised seals are aligned with and receive the first and second seals of the first element, respectively. A chamber is defined between the surfaces of the first and second elements and between the first raised seals and the second raised seals of the first and second elements.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
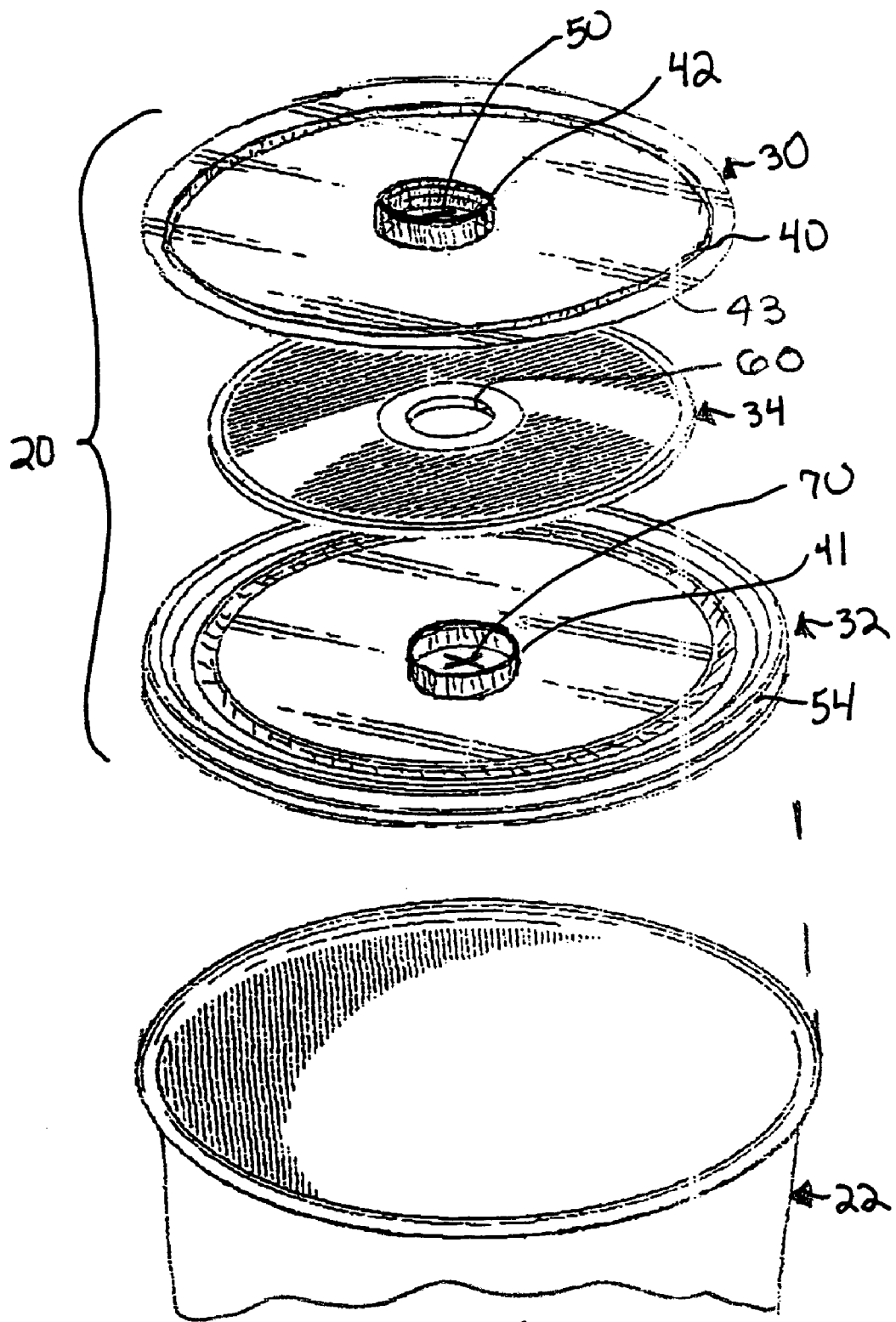
FIG. 1 is an exploded isometric view of a container lid in accordance with the present invention, showing the elements of the lid and a partial view of a container.

Reference should now be made to the drawing Figures on which similar or identical elements are given consistent identifying numerals throughout the various Figures thereof, and on which parenthetical references to Figure numbers, when used, direct the reader to the view(s) on which the element(s) being described is (are) best seen, although the element(s) may be seen on other Figures also.

Figure 2:
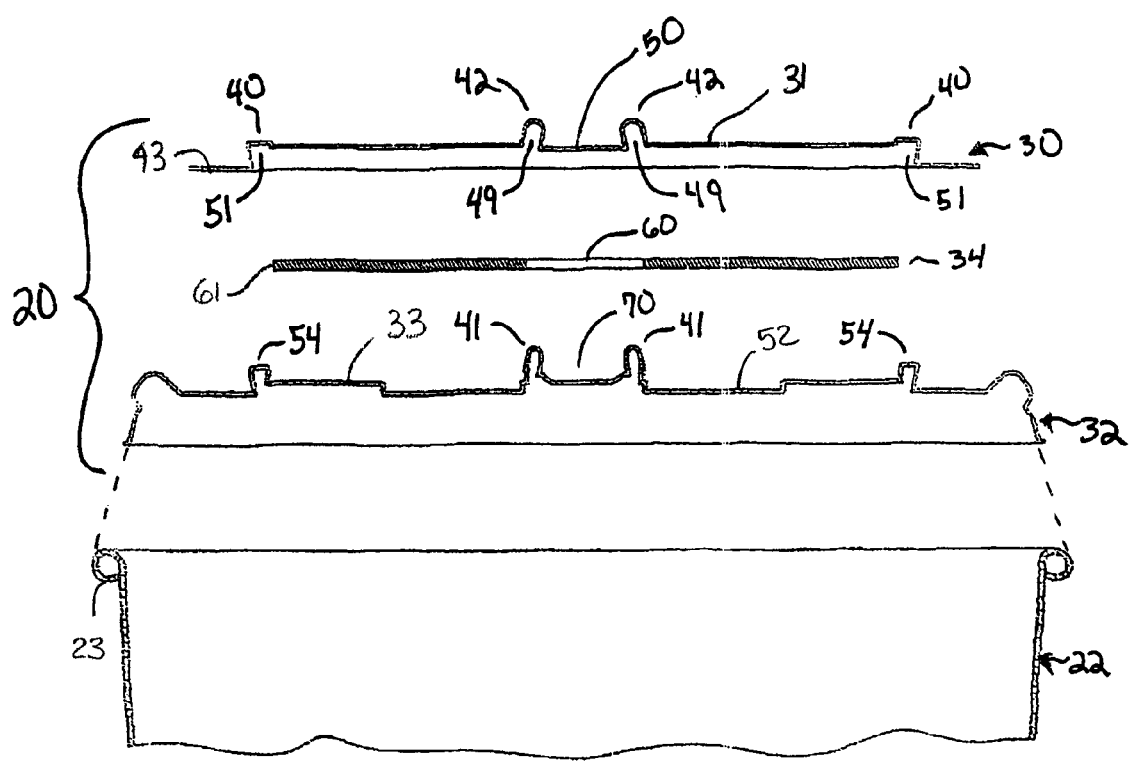
FIG. 2 is an exploded side elevational view of the container lid illustrated in FIG. 1.

FIGS. 1 and 2 illustrate a container cup lid, generally indicated by the reference numeral 20, disposed over an open-top container cup 22. Container cup lid 20 includes a generally planar top or upper element 30 and a bottom or lower element 32 with a generally planar disc-shaped media 34 disposed therebetween. A pair of concentric raised seal rings 40 and 42 extend from an upper surface 31 of upper element 30. Seal rings 40 and 42 are hollow, forming spaces 49 and 51 respectively. Seal ring 40 is a major seal and defines an outer lip 43. Seal ring 42 is a minor seal ring that has a substantially smaller diameter with respect to the diameter of major seal ring 40. Seal rings 40 and 42 may be, without limitation, conical, cylindrical, reverse conical, partially conical and partially cylindrical in shape.

Lower element 32 includes a pair of concentric raised seal rings 41 and 54 formed on an upper surface 33 of lower element 32. Rings 40 and 42 of upper element 30 and rings 41 and 54 of lower element 32 are positioned and dimensioned to sealingly engage each other, respectively. When upper element 30 and lower element 32 are aligned and pressed together, an annular chamber 53 is formed for receiving and holding disc-shaped media 34. Media 34 has a central aperture 60 that is larger than the outer diameter of seal ring 41 of lower element 32. The chamber 53 is defined between concentric seal rings 41 and 54 and is sized to retain the disc-shaped media 34. The size of chamber 53 between rings 41 and 54 can vary to adjust to the space needed to contain disc-shaped media 34. This relationship can be seen with reference to FIG. 2. In the alternative, one or more additional seal rings may be incorporated into the cup lid 20 wherein the additional rings are outside the space defined by the minor and major seal rings. The term "ring" as utilized herein is not limited to circular structures. Ring refers to any shape that will permit the incorporation of a disc-shaped media and provide a seal between the upper and lower elements 30 and 32 at the central annular aperture 60 and the outer perimeter 61 of disc-shaped media 34.

The seals formed by mating rings 40 and 42 with 54 and 41, respectively, are resistant to liquids. When upper element 30 and lower element 32 are sealingly engaged, disc-shaped media 34, retained therebetween, is protected from contact with the beverage or other material contained in cup 22 when container cup is placed thereover.

Figure 3:
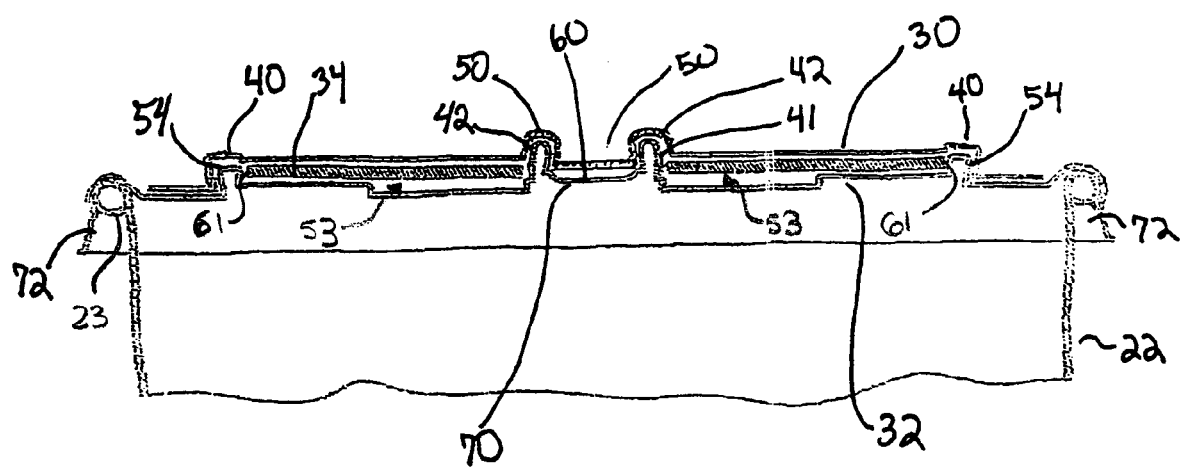
FIG. 3 is a side elevational view of the container lid illustrated in FIGS. 1 and 2, showing the container lid assembled.

FIG. 3 illustrates the elements of container cup lid 20 with media disc 34 disposed therein and fitted on top of cup 22. Upper element 30 has a descending generally cylindrical or center open portion 50. The lower element 32 is designed to keep the liquid in container cup 22 by sealingly engaging the cup top 23 at the periphery 72 of lower element 32.

Figure 4:
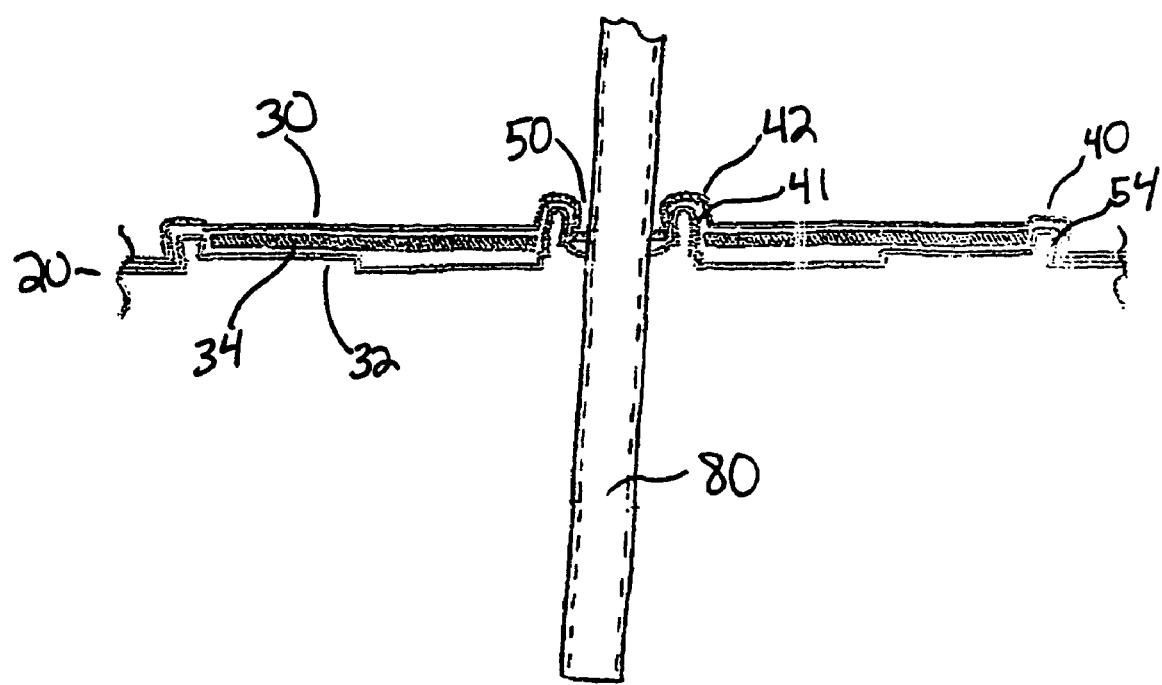
FIG. 4 is a side elevational view of the container lid illustrated in FIG. 3, showing a straw inserted therethrough.

FIG. 4 illustrates the configuration of container lid 20 with a straw 80 inserted through opening 50 in upper element 30, through the central aperture 60 of media 34, and through the opening 70 in the lower element 32. The opening 70 in the lower element 32 preferably comprises an X-shaped or similar cuts to facilitate passage of straw 80 therethrough. Upper element opening 50 is preferably a hole or, in the alternative, may be an X-shaped or similar cuts aligned with similar cuts in opening 70 to facilitate passage of straw 80 therethrough. It is preferable to use a round opening 50 die-cut in upper element 30 and X-shaped die-cut opening 70 in lower element 32.

Figure 5:
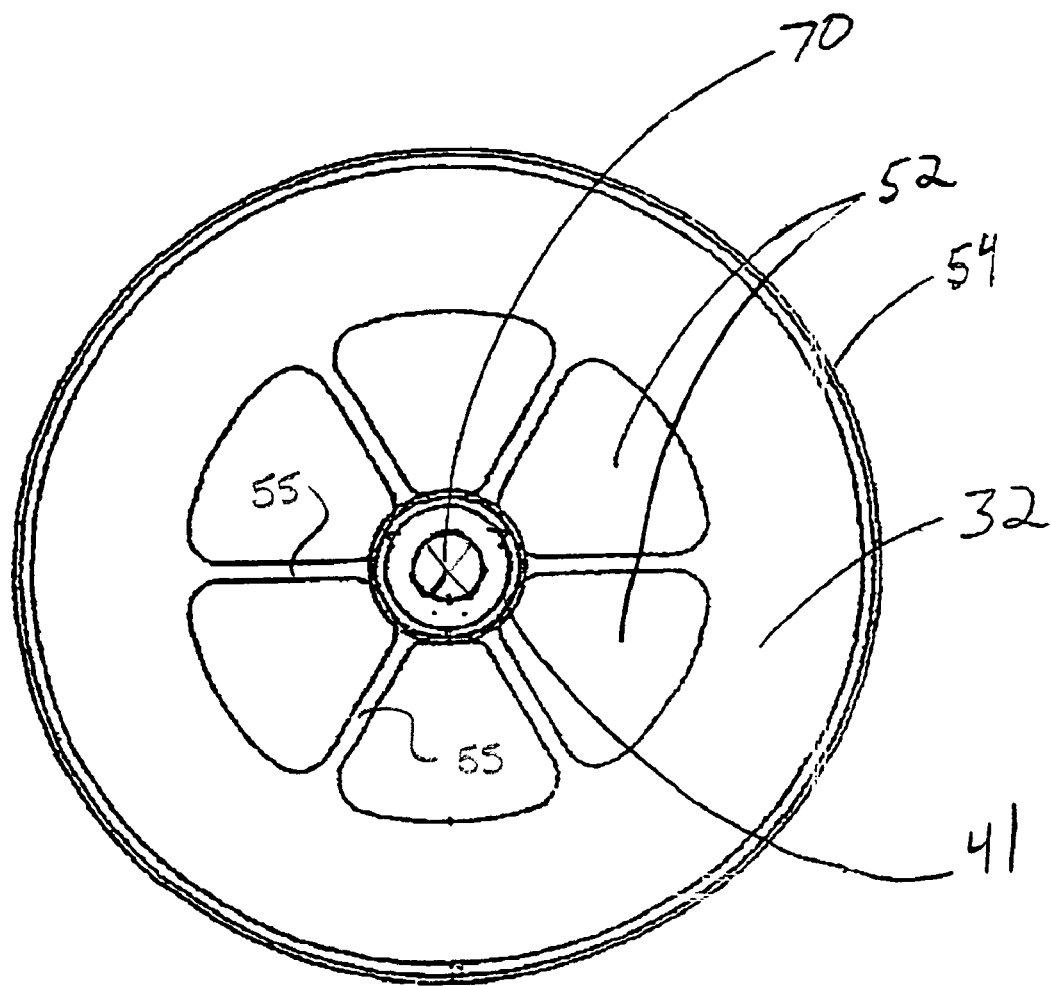
FIG. 5 is a top plan view of one element of the container lid illustrated in FIGS. 1 and 2, showing indentations in the element.

Surrounding the minor seal ring 41 of lower element 32 are a series of indentations 52 in the surface 33 of lower element 32 which are separated by un-indented material 55, as seen in FIG. 5. Two or more indentations 52 may be formed into lower element 32 with four to eight such indentations 52 being preferred. FIG. 5 illustrates six of indentations 52. The result is a spoke-like structure. This spoke-like structure strengthens element 32. When lid 20 containing this spoke-like structure is assembled, the resulting lid has been stiffened and resists being deformed and pressed into the beverage container 22 when straw 80 is inserted through the lid. When the disc-shaped media 34 is inserted into lid 20, the resulting lid structure is further stiffened and provides even greater resistance to being deformed by insertion of a straw 80.

Upper element 30 and lower element 32 may be constructed by vacuum forming or injection molding certain well known plastic materials in a manner well known in the art. The thickness of the plastic sheet material from which blanks are formed may range from about 0.005 inches to, in some extreme cases, to about 0.060 inches. In a particular embodiment, when vacuum formed, 12-mil thick polystyrene or other suitable material is preferred. An important feature of container lid 20 is that the container lid won't come apart when handled.

Container lid 20 can be assembled using high-speed assembly equipment to combine upper element 30, lower element 32 and disc shaped media disc.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like when used herein, refer to the positions of the respective elements shown on the accompanying drawing figures and the present invention is not necessarily limited to such positions.

Although described primarily with respect to digital media disks, it is also to be understood that the lid of the invention may be formed in different configurations to hold and display many different items, such as game cards, game pieces, toys, coupons, stamps and stickers, scratch-off cards, and the like.

It is further to be understood, as part of the invention, that in certain applications of the invention it may be found desirable to permanently join the inner and outer members, as by sonic welding or thermal welding, so that the lid must be "broken" in order to gain access to the premium or other item contained between the inner member and the outer member.

What have been described are various exemplary embodiments of closures for use with drink cups. It should be a understood, however, that the examples described herein merely illustrate aspects of the invention and should not be construed as limiting the scope of the invention which may be implemented in any manner consistent with the general principles of the invention described therein.

What is claimed is:

1. A lid for a container, comprising:
 a first element adapted to releasably engage the container and including first and second raised seals extending from a surface of said first element, said first raised seal having a diameter larger than a diameter of said second raised seal, and an opening centrally disposed in said first element;
 a second element engageable with said first element, said second element including first and second raised seals extending from a surface of said second element and an opening centrally disposed therein, said first and second raised seals being aligned with and receiving said first and second seals of said first element, respectively, such that said second seal of said second element covers said second seal of said first element; and
 a chamber defined between said surfaces of said first and second elements and between said first raised seals and said second raised seals of said first and second elements.

2. A lid according to claim 1, wherein
a media member is disposed in said chamber.

3. A lid according to claim 2, wherein
said media member is disc shaped and includes an opening aligned with said openings of said first and second elements.

4. A lid according to claim 2, wherein
said second seal of first element extends through said opening of said media member.

5. A lid according to claim 1, wherein
each of said raised seals is generally ring shaped.

6. A lid according to claim 1, wherein
said openings of said first and second elements are crossed slots.

7. A lid according to claim 1, wherein
the container is a beverage container; and
said engagement of said first and second raised seals of said first and second elements substantially prevents the beverage of the container from entering said chamber.

8. A lid according to claim 7, wherein
said openings of said first and second elements are adapted to receive a straw.

9. A lid according to claim 1, wherein
said first element includes a plurality of radial indentations extending from said second raised seal towards said first raised seal.

* * * * *